(No Model.)
J. A. STEWARD.
SOLDERING MACHINE.
No. 493,309. Patented Mar. 14, 1893.
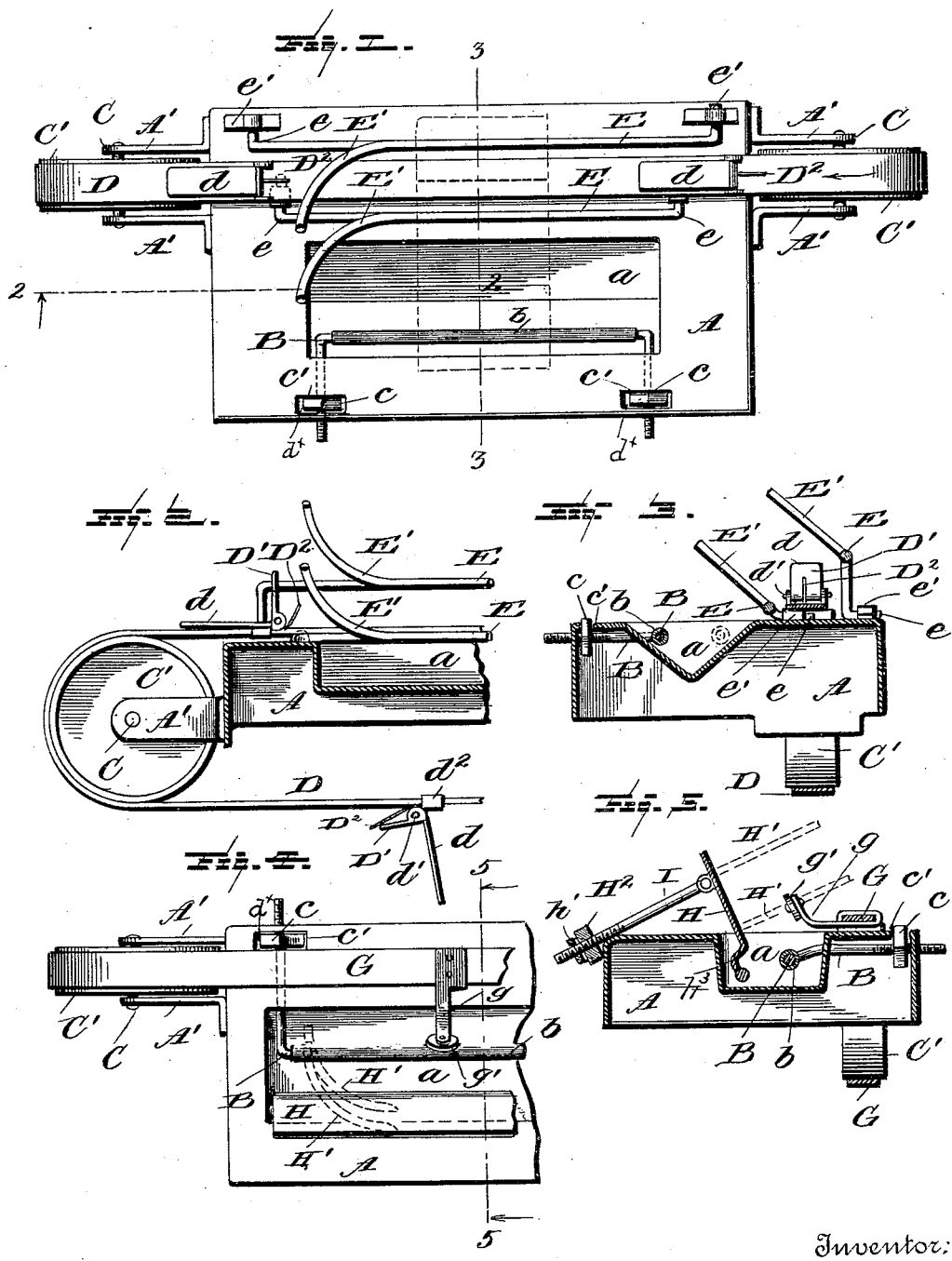
Witnesses
L. C. Hills.
E. H. Bond
Inventor:
John A. Steward,
By E. B. Stocking
Attorney

UNITED STATES PATENT OFFICE.

JOHN A. STEWARD, OF EAST CLARENDON, VERMONT.

SOLDERING-MACHINE.

SPECIFICATION forming part of Letters Patent No. 493,309, dated March 14, 1893.

Application filed May 26, 1892. Serial No. 434,500. (No model.)

*To all whom it may concern:*

Be it known that I, JOHN A. STEWARD, a citizen of the United States, residing at East Clarendon, in the county of Rutland, State of Vermont, have invented certain new and useful Improvements in Soldering-Machines, of which the following is a specification, reference being had therein to the accompanying drawings.

This invention relates to certain new and useful improvements in soldering machines, of that class in which an endless belt is employed in connection with a trough or receptacle for the solder and into and through which the can is carried by the belt or carrier, and it has for its object among others to provide an improved device of this character which shall be equally as well adapted for rectangular cans as for cylindrical ones, and in which provision shall be made for adjustment to accommodate cans of different sizes, whereby they shall be presented to the solder at the proper angle and depth and also providing for operation upon cans or decorated work without scratching or marring the same.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which Figure 1 is a top plan of my improved soldering machine. Fig. 2 is a detail in vertical longitudinal section, the section being taken on the line 2 2 of Fig. 1, looking in the direction of the arrow. Fig. 3 is a vertical cross section on the line 3 3 of Fig. 1. Fig. 4 is a top plan with the belt employed for round cans. Fig. 5 is a vertical cross section on the line 5 5 of Fig. 4.

Like letters of reference indicate like parts throughout the several views in which they appear.

Referring now to the details of the drawings by letter, A designates a tank or a suitable support or table provided with a receptacle or trough $a$ in which is designed to be kept molten solder which may be kept in its molten state in any suitable manner, as for instance by suitable heating means (not shown) located beneath the table A. This trough may assume any desired shape; I have shown it in Fig. 3 as substantially V-shaped while in Fig. 5 is shown a substantially rectangular form.

B is a wire or support which extends within the trough parallel with the length thereof and that portion within the trough is provided with an asbestus or analogous covering or shield $b$ as seen in the various views to prevent the solder from adhering to the wire, which is an essential feature in decorated work or in soldering on a narrow edge which is left plain. This wire is adjustable to accommodate cans of varying sizes and to permit the edge to dip more or less into the solder and in its simplest form is constructed with its ends bent at right angles to the part in the trough and extended through the side of the trough and through the side of the table, being provided with adjusting nuts $c$ on screw threaded portions thereof which nuts are arranged between the outer wall of the table and the edge $c'$ formed by making the holes $d^\times$ in which the said nuts are arranged, as seen best in Fig. 4. It will be readily seen how by turning these nuts one way or the other the portion within the trough may be adjusted farther in or out as occasion may require. The table A and trough will be supported in the desired position in any suitable manner.

At opposite ends of the table are provided the arms A' in which are journaled the shafts C which carry the pulleys C' over which are designed to run the belts which are employed for the purpose of carrying the cans, there being interchangeable belts which are to be used according to whether rectangular or cylindrical cans are to be operated upon. For rectangular cans I employ the belt D which is provided with the pivoted holders $d$ which are pivoted as at $d'$ to clamps or analogous devices $d^2$ on the belt and under the short arm D' is arranged a spring $D^2$ as seen best in Fig. 2 which serves to normally keep the holders distended. For square or rectangular cans I preferably employ the arms E which are removably held to the table in any suitable manner, as by having their ends bent as shown at $e$ in Fig. 1 and removably inserted in suitable keepers $e'$ on the said table; these arms carry the curved arms $E'$ which extend in parallel planes and at the discharge end of the trough extend over the trough. While these curved arms extend in parallel planes this plane is an inclined one substantially that of the incline of the wall of the trough as seen in Fig. 3, although not necessarily so, so that the lower edge only of the can will rest in the solder.

The operation is apparent; a rectangular can is placed upon the belt at the right hand end of Fig. 1 which is taken up by the holder then at that position and as the belt moves in the direction of the arrow the can is carried along with its bottom on the wire B and its under side resting upon the arms E with its edge in the solder a distance which is regulated by the adjustment of the wire B; as the can approaches the curved arms it is by them gradually turned a quarter round and as it reaches the outer ends of the said curved arms it will automatically of its own weight roll or turn upon the next adjacent side and slide down the incline of the curved arms where it will be taken up by the next holder on the belt and again carried up the curved arms and thus till all four sides have been presented and soldered when it is removed from the machine by hand. The rosin or flux receptacle should be arranged conveniently for use. If desired the trough may be of such length as to permit of operation on several cans at the same time, the principle will be the same.

In operating upon round cans the rods E are removed and simple straight ones substituted therefor, or the curved arms $E'$ may be made detachable from the said rods E to avoid the necessity of removal of the said rods, and the belt G is substituted for the belt D; this belt has the arms $g$ in place of the pivoted holders, and these arms carry the rollers $g'$ as seen in Figs. 4 and 5 and which are designed to revolve against the can as it is being moved along by the belt and revolve it.

In place of simple rods, as E, for use in connection with the round cans I may employ an inclined plate H as seen in Fig. 4, which may also be employed instead of the rods E when operating on square cans, in which case the said inclined plate would be provided with the curved arms $H'$ as indicated by dotted lines in Fig. 4 to serve the same purpose, namely, to turn the cans over as they ride up said curved arms. The inclined plate H whether used for square or round cans is preferably adjustable and preferably in this way; it is pivoted at its lower edge as at $h$ in any suitable manner within the trough, and near its upper end upon the outer face is pivoted one or more rods I which pass through a flange $h'$ on the outer edge of the trough and are provided with adjusting nuts $H^2$ as seen in Fig. 5 by which the inclination of the plate may be changed as may be desired. It may be provided with the curved arms as indicated by dotted lines in said Fig. 5. The cans are carried along by the belt, being pushed and at the same time revolved by the rollers acting against the same, the length of the trough being such that the can will receive the solder all around its edge by the time it has reached the discharge end of the trough. It will be noticed on reference to Fig. 5 that this plate H has a bend $h^3$ within the trough to avoid a perpendicular wall, for if the plate was straight at this point the solder would not flow up on the bottom of the work all the way around but with this construction the solder will come up on the bottom thereby doing much better and smoother work and with quite a saving of solder.

Modifications in detail may be resorted to without departing from the spirit of the invention or sacrificing any of its advantages.

What I claim as new is—

1. The combination with a trough, of a pivoted inclined plate having a portion within the trough provided with a bend near its pivot and between the same and the bottom portion of said plate with which the can contacts, substantially as described.

2. The combination with a trough, of an inclined plate pivoted within the trough and provided with a bend near its pivot and between the same and the bottom portion of said plate with which the can contacts, as set forth.

3. The combination with a trough, of an inclined plate pivoted within the trough and having a bend near its pivot and between the same and the bottom portion of said plate with which the can contacts, and means for adjusting said plate, as set forth.

4. The combination with a trough and an endless conveyer provided with devices for engaging a can, of removably supported arms having curved portions fixed relatively to the conveyer and trough and upon which the can is designed to ride and by which it is turned, as set forth.

5. The combination with the can-supporting devices, of an endless conveyer and arms thereon provided with rollers to engage a can as and for the purpose specified.

In testimony whereof I affix my signature in presence of two witnesses.

JOHN A. STEWARD.

Witnesses:
JOHN HOWE,
THOS. C. ROBBINS.